(12) United States Patent
Johnson

(10) Patent No.: US 7,556,237 B2
(45) Date of Patent: Jul. 7, 2009

(54) FLUSH VALVE

(75) Inventor: Dwight N. Johnson, Carlsbad, CA (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 11/825,223

(22) Filed: Jul. 5, 2007

(65) Prior Publication Data

US 2008/0006789 A1  Jan. 10, 2008

Related U.S. Application Data

(63) Continuation-in-part of application No. 11/481,220, filed on Jul. 5, 2006.

(51) Int. Cl.
*F16K 31/12* (2006.01)
(52) U.S. Cl. .......................... 251/40; 251/38
(58) Field of Classification Search ................... 251/38, 251/40
See application file for complete search history.

(56) References Cited

U.S. PATENT DOCUMENTS

| | | | |
|---|---|---|---|
| 1,516,814 A * | 11/1924 | Flynn | ........................... 251/40 |
| 5,150,877 A | 9/1992 | Whiteside et al. | |
| 5,213,305 A | 5/1993 | Whiteside et al. | |
| 5,232,194 A | 8/1993 | Saadi et al. | |
| 5,295,655 A * | 3/1994 | Wilson et al. | .................. 251/40 |
| 5,649,686 A | 7/1997 | Wilson | |
| 5,730,415 A | 3/1998 | Gronwick | |
| 5,755,253 A * | 5/1998 | Gronwick | .............. 137/315.07 |
| 6,216,730 B1 | 4/2001 | Hall | |
| 6,299,127 B1 | 10/2001 | Wilson | |
| 6,299,128 B1 | 10/2001 | Verdecchia | |
| 6,499,152 B2 | 12/2002 | Johnson | |

FOREIGN PATENT DOCUMENTS

DE  197 38 723 A1  3/1998

\* cited by examiner

*Primary Examiner*—John K Fristoe, Jr.
(74) *Attorney, Agent, or Firm*—Foley & Lardner LLP

(57) ABSTRACT

Tilting of a main valve assembly under high inlet pressure conditions is prevented by supporting the main valve assembly with housing rib engaging a skirt on the main valve guide tube. Pilot valve opening results from contact of an enlargement on the pilot valve stem with the push rod as the pilot valve begins its upward movement. An off center baffle compensates for the pressure pattern resulting from the side entry inlet. Throttling structure provided by a skirt on the guide tube cooperating with a shoulder in the outlet passage provides a desirable large flush flow. The inlet and handle openings in the valve body include bosses adjacent thereto an internal to the housing.

9 Claims, 7 Drawing Sheets

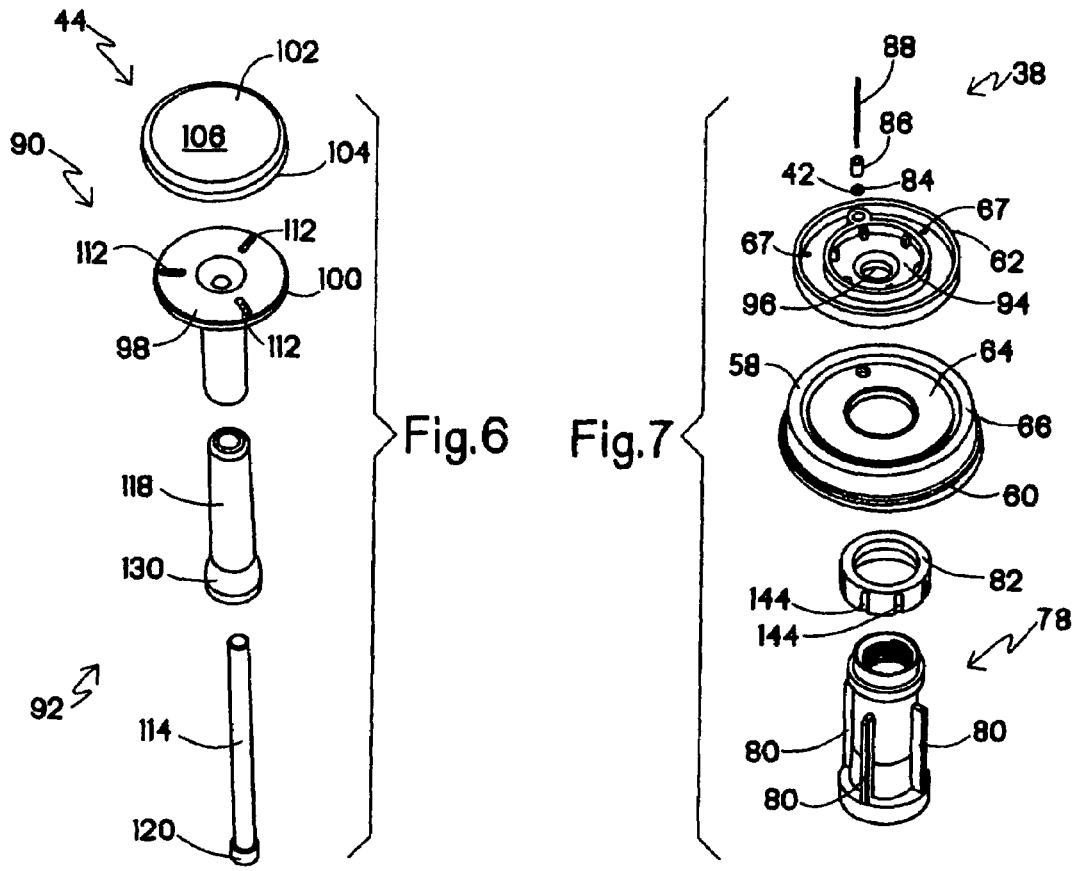
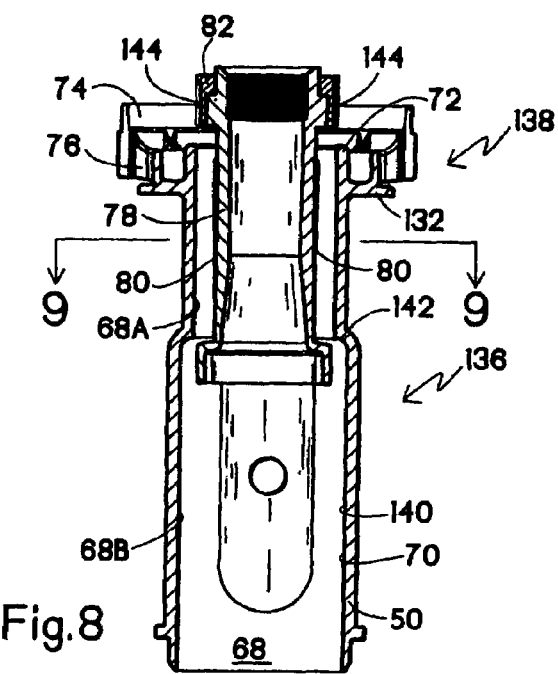

ly a diaphragm with a portion of the diaphragm, or an element

FLUSH VALVE

CROSS REFERENCE TO RELATED APPLICATION

This application is a continuation-in-part and claims priority from U.S. patent application Ser. No. 11/481,220 filed Jul. 5, 2006, herein incorporated by reference in its entirety.

FIELD OF THE INVENTION

The present invention relates to an improved flush valve for plumbing fixtures.

DESCRIPTION OF THE PRIOR ART

Flushing systems for toilet fixtures in applications such as commercial structures normally include a flush valve supplying water to flush each fixture. The flush valve is conventionally a flushometer type, operating to supply a measured or metered volume of water for the flushing operation. Examples of conventional flush valves are disclosed in U.S. Pat. Nos. 4,327,891 and 5,295,655. Another flush valve is disclosed in U.S. Pat. No. 4,662,602.

A typical flush valve includes a main valve to control flow through the flush valve from an inlet to an outlet. Inlet pressure in a control chamber normally holds the main valve member closed against the main valve seat. A seal, typically a diaphragm with a portion of the diaphragm, or an element supported by the diaphragm, serving as a main valve member, isolates the control chamber from inlet pressure. A pilot or relief valve member cooperates with a pilot valve seat. The pilot valve seat may be formed in the diaphragm or in an element supported by the diaphragm, and for example may be part of the main valve member.

The pilot valve member typically has a stem adapted to be contacted by an actuator. In a manually operated flush valve, the actuator may be a plunger or push rod that is moved into contact with the stem by an operating handle. When the stem is pivoted or tilted by the actuator, the pilot valve opens to exhaust the control chamber to the outlet of the flush valve. Inlet pressure moves the valve member from the closed position to an open position, and water flows through the flush valve to flush a fixture. Water gradually flows into the control chamber through a restricted orifice, moving the diaphragm and main valve member back toward the closed position. After a measured volume of flow, the main valve closes, terminating the flushing operation.

One problem with known flush valves is unreliable and inconsistent initiation of a flush cycle under high inlet pressure conditions. Inlet pressure can clamp the pilot valve closed tightly, and tilting of the pilot valve and stem can result in tilting of the main valve member rather than opening of the pilot valve. If this occurs, the control chamber is not fully vented and the desired flushing operation does not take place.

Another problem encountered with known flush valves occurs when the actuator tilts the pilot valve stem only slightly. A short, rapid movement of the actuator may fail to open the pilot valve and vent the control chamber due to factors such as inertia of the pilot valve.

A typical flush valve has a side entry inlet. Water flowing through the valve enters from the side and then flows up and over the main valve seat with a non uniform pressure and flow pattern resulting from the effect of side entry velocity. Side loading can cause friction, reducing valve life, as well as inconsistent flush volume. In addition, the nonuniform water pressure field in the control chamber results in flush valve operation being sensitive to location of elements such as the restricted orifice.

Another problem with known flush valves is pilot valve wear. In the typical arrangement, in the full open position a rigid plastic poppet contacts a fixed elastomeric seating area. Wear results from repeated valve operation, and replacement and repair is difficult.

In a known flush valve, when the main valve opens, a maximum flow occurs, and the flow decreases as the main valve returns to the closed position. A flow throttling structure is typically incorporated in the main valve assembly to regulate the flow characteristic. However, known flow throttling arrangements do not overcome the problem of continuously decreasing flow as the valve closes.

SUMMARY OF THE INVENTION

A primary object of the present invention is to provide an improved flush valve for supplying a measured and regulated flow of water for flushing a plumbing fixture. Other objects are to provide a flush valve having a pilot valve construction that provides a long service life and is easy to replace if worn; to provide a flush valve that achieves a consistent and reliable flushing operation when actuated at high inlet pressures that tend to clamp the pilot valve closed; to provide a flush valve with which reliable actuation is achieved if the manipulation of the actuation handle is short and rapid or tentative; to provide a flush valve in which difficulties arising from non uniform pressure caused by side water inlet are avoided; to provide a flush valve capable of maintaining a relatively uniform flow rate during the initial flush portion of a flush cycle for a siphon type toilet fixture; and to provide an improved flush valve that is relatively inexpensive, easy to manufacture and repair, and that overcomes problems experienced with known flush valves.

In brief, in accordance with the present invention, there is provided a flush valve for a plumbing fixture. The flush valve includes a housing having a longitudinal axis, an inlet, an outlet and a main valve seat between the inlet and the outlet, the main valve seat being oriented transverse to the axis. A main valve assembly includes a main valve member movable in the axial direction relative to the main valve seat. A control chamber at a first side of the main valve member communicates with the inlet for normally holding the main valve member against the main valve seat. The main valve assembly includes a guide tube extending axially from a second side of the main valve member. The main valve assembly including a pilot valve seat. A pilot valve member moves relative to the pilot valve seat. A stem extends axially from the pilot valve member. An actuator at a first side of the axis is engageable with the stem for tilting the pilot valve by laterally moving the stem. The housing includes a support abutment engaging the guide tube at a second side of the axis opposite to the first side of the axis for opposing the tilting force applied by the pilot valve to the main valve assembly during the lateral movement of the stem.

In brief, in accordance with another feature of the invention, there is provided a flush valve for a plumbing fixture including a housing having a longitudinal axis, an inlet, an outlet and a main valve seat between the inlet and the outlet, the main valve seat being oriented transverse to the axis. A main valve assembly includes a main valve member movable in the axial direction relative to the main valve seat. The main valve assembly includes a pilot valve seat. A pilot valve member moves relative to the pilot valve seat. A control chamber is located at a first side of the main valve member. A restricted passage between the inlet and the control chamber normally pressurizes the control chamber and holds the main valve member against the main valve seat and the pilot valve member against the pilot valve seat. A stem extends axially from the pilot valve member in a first axial direction away from the control chamber. The stem has an end portion and an intermediate portion between the end portion and the pilot valve. An actuator is engageable with the intermediate portion of the stem for tilting the pilot valve by laterally moving the stem in order to exhaust the control chamber and permit axial movement of the main valve assembly in an opposed second axial direction. An enlargement at the end portion of the stem is engageable with the actuator during the axial movement in the second direction for further lateral movement of the stem and further tilting of the pilot valve.

In brief, in accordance with another feature of the invention, there is provided a flush valve for a plumbing fixture including a housing having a longitudinal axis and a main valve seat oriented transverse to the axis. The housing includes a tubular wall defining an outlet passage extending axially from a first side of the main valve sea. An annular inlet chamber surrounds the tubular wall. The housing includes an inlet passage extending radially into the inlet chamber. A main valve assembly includes a main valve member movable in the axial direction relative to the main valve seat. An annular passage extends from the inlet chamber to the main valve seat. A baffle is located in the annular passage. One of the annular passage and baffle is symmetrical about the axis and the other of the annular passage and baffle is asymmetrical with respect to the axis In brief, in accordance with another feature of the invention, there is provided a flush valve for providing a metered flushing water flow to a plumbing fixture. The flush valve includes a housing having an inlet, an outlet and a main valve seat, and a tubular wall defining an outlet passage extending from a first side of the main valve seat toward the outlet. An annular inlet chamber surrounds the tubular wall and communicates with the inlet and with the main valve seat. A main valve assembly includes a main valve member movably toward the main valve seat to a closed position and away from the main valve seat to a full open position. A normally pressurized control chamber is in the housing at a second side of the main valve seat. The main valve assembly includes a sealing member between the main valve member and the housing for isolating the control chamber from the inlet chamber. A pilot valve assembly is operable from a blocked position to a vent position for venting the control chamber to the outlet and moving the main valve member in the control chamber from the closed position to the full open position. A stop in the control chamber is engageable with the pilot valve assembly in the full open position of the main valve member for holding the pilot valve assembly in its blocked position. A restricted passage extendes between the inlet chamber and the control chamber for repressurizing the control chamber and returning the main valve member from the full open position to the closed position. First and second flow throttling assemblies are formed on the housing and on the main valve assembly. The first flow throttling assembly has a minimum throttling effect in the full open position of the main valve and provides increasing flow throttling as the main valve member moves toward the closed position. The second flow throttling assembly has a maximum throttling effect in the full open position of the main valve and provides decreasing flow throttling as the main valve member moves toward the closed position.

In brief, in accordance with another feature of the invention, there is provided a flush valve for providing a metered flushing water flow to a plumbing fixture. The flush valve includes a housing having an inlet, an outlet and a main valve seat. A main valve assembly includes a main valve member movably toward the main valve seat to a closed position and away from the main valve seat to a full open position. A normally pressurized control chamber is in the housing at one side of the main valve seat. The main valve assembly includes a sealing member between the main valve member and the housing for isolating the control chamber from the inlet chamber. A pilot valve assembly is operable from a blocked position to a vent position for venting the control chamber to the outlet and moving the main valve member in the control chamber from the closed position to the full open position. The pilot valve assembly includes a pilot valve seat in the main valve assembly and a pilot valve member including a head portion in the control chamber engageable with the pilot valve seat in the blocked position. A stop in the control chamber is engageable with the pilot valve head portion in the full open position of the main valve member for holding the pilot valve assembly in its blocked position. A restricted passage extends between the inlet chamber and the control chamber for repressurizing the control chamber and returning the main valve member from the full open position to the closed position. The head portion includes an inner body and an elastomeric seal member removably attached over the inner body. The seal member has a cup shape with a base portion overlying the inner body and a rim portion around the periphery of the inner body and engageable between the inner body and the pilot valve seat in the blocked position of the pilot valve. The stop includes a valve rotator structure engageable with the base portion of the seal member in the full open position of the main valve member

BRIEF DESCRIPTION OF THE DRAWING

The present invention together with the above and other objects and advantages may best be understood from the following detailed description of the preferred embodiment of the invention illustrated in the drawings, wherein:

FIG. 6 is an exploded isometric view of the pilot valve assembly of the flush valve;

FIG. 7 is an exploded isometric view of the main valve assembly of the flush valve;

FIG. 8 is a cross sectional view of the frame and guide tube of the flush valve taken along the line 8-8 of FIG. 5;

DETAILED DESCRIPTION OF THE PREFERRED EMBODIMENT

Figure 1:
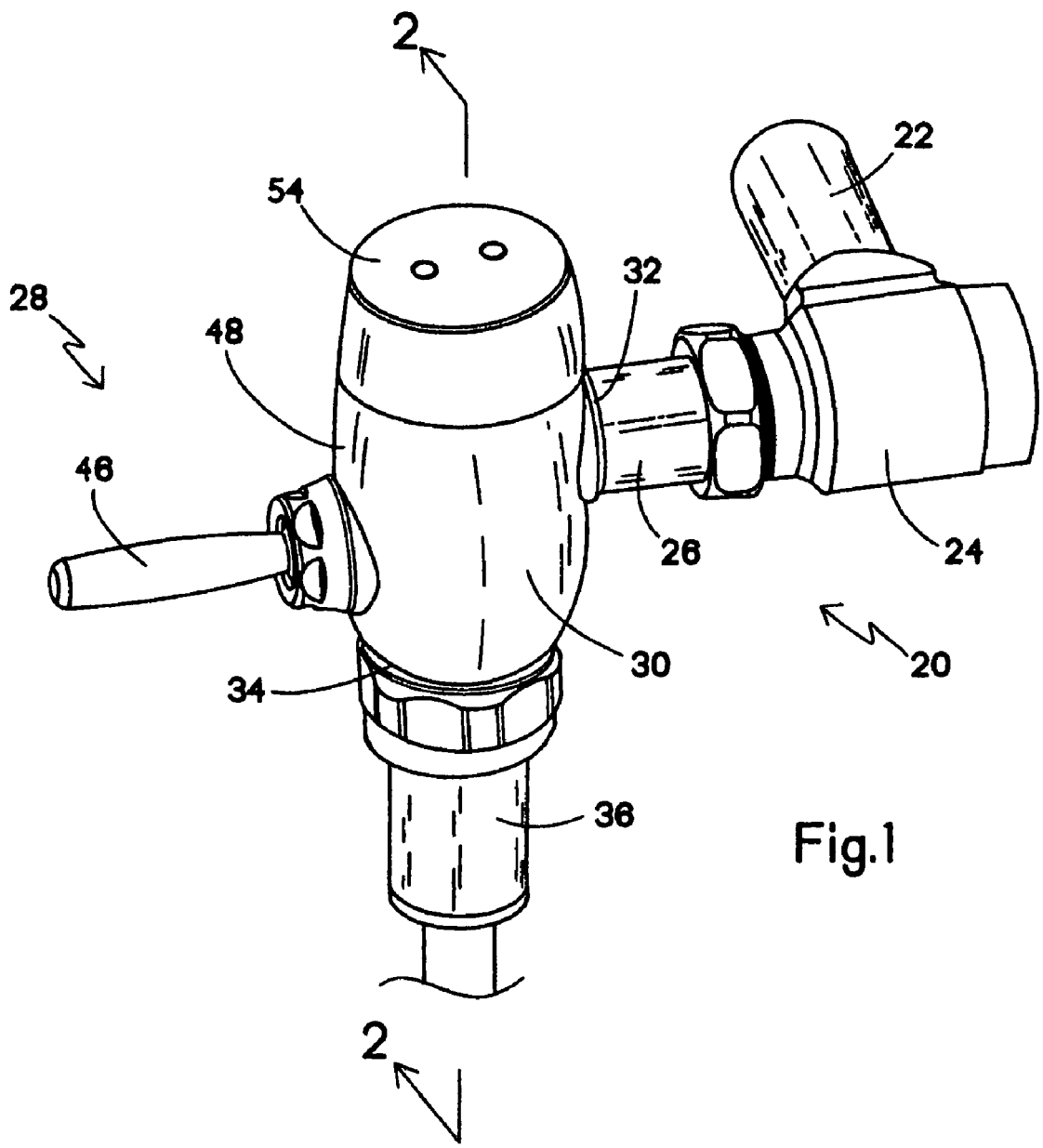
FIG. 1 is an isometric view of a plumbing installation including a control stop and a flush valve constructed in accordance with the present invention.

Having reference now to the drawing, and initially to FIG. 1, there is illustrated a plumbing installation generally designated as 20 for flushing a toilet fixture (not shown). The plumbing installation 20 has a water supply conduit 22 through which water is supplied from a pressurized source such as a municipal or local water supply system. Conduit 22 supplies water to a throttling control stop 24, and water from the control stop 24 is supplied through a transfer conduit 26 to a flush valve generally designated as 28 and constructed in accordance with the principles of the present invention.

The flush valve 28 of the present invention is illustrated in detail in FIGS. 2-12. In general the flush valve 28 includes a housing assembly 30 with an inlet 32 connected to the conduit 26 and an outlet 34 adapted to be connected to an outlet conduit 36 (FIG. 1). A main valve assembly 38 is movable between a closed position (FIG. 2) and a full open position (FIG. 5) to control flow from the inlet 32 to the outlet 34. The main valve assembly is normally held closed by pressure in a control chamber 40. The control chamber is normally pressurized by restricted communication with inlet 32 through a restricted passage 42. A pilot valve assembly 44 is movable from a closed or blocked position (FIG. 2) to an open or vent position (FIGS. 3 and 4) to rapidly exhaust the control chamber 40 to the outlet 34 for abruptly opening the main valve assembly 30. The pilot valve assembly 44 is actuated to its open or vent position by manipulation of a handle 46. The principles of the invention are applicable to flush valves with other actuation systems such as electrically operated flush valves.

The housing assembly 30 includes a body 48 and a frame 50 mounted inside the body 48. The conduit 26 is secured to the body 48 at the inlet 32. The outlet 34 is located at the lower end of the body 48. An inlet pressure region 52 is defined between the body 48 and the frame 50. The upper end of the housing assembly 30 is closed by a cap 54 that is secured to the body 48. An inner cover 56 is captured beneath the cap 54.

The main valve assembly 38 includes a diaphragm 58 having a peripheral seal portion 60 captured between the inner cover 56, the frame 50 and the body 48 to seal the control chamber 40. A diaphragm plate 62 supports a central valve member portion 64 (FIG. 7) of the diaphragm 58. The restricted passage 42 extends through the diaphragm 58 and plate 62 for continuous restricted communication between the inlet pressure region 52 and the control chamber 40. The diaphragm 58 has a rolling membrane portion 66 that provides a long operating stroke and large control chamber volume, with very little friction and no appreciable centering bias. Vent openings 67 (FIG. 7) in the diaphragm plate 62 prevent an off-seat squeak or squeal condition by venting the upper portion of the diaphragm 58 to the control chamber and clamping the diaphragm 58 against the diaphragm plate 62.

Figure 2:
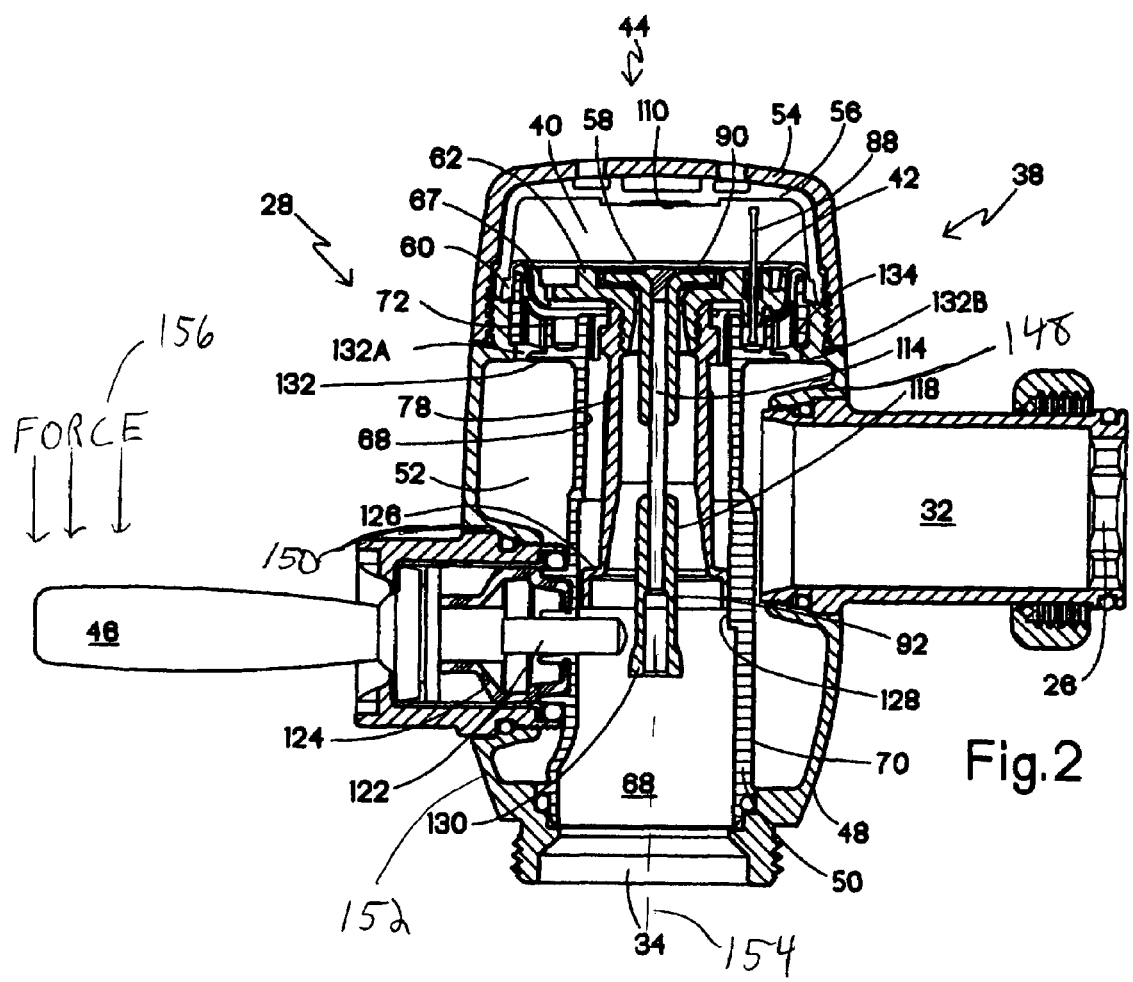
FIG. 2 is an enlarged, vertical cross sectional view of the flush valve taken along the line 2-2 of FIG. 1 and showing the flush valve in the closed, standby position.

An outlet passage 68 extends down through a tubular wall portion 70 of the frame 50 to the outlet 34. The frame 50 includes an annular main valve seat 72 that is engaged by the valve member portion 64 of the diaphragm 58 in the closed position (FIG. 2). This prevents flow from the inlet 32 and inlet pressure region 52 across the main valve seat 72 to the outlet passage 68 and outlet 34. The frame 50 includes a flange portion 74 and ribs 76 (FIGS. 8 and 10) to support the rolling membrane 66 of the diaphragm 58.

The main valve assembly 38 includes a guide tube 78 attached to the diaphragm plate 62 and extending downward within the tubular wall 70 of the frame 50. Guide ribs 80 on the guide tube 78 (FIGS. 7 and 9) slideably engage the tubular wall 70 and center the guide tube 78 and the main valve assembly 38 with in the housing assembly 30. The main valve assembly 38 also includes a refill flow control ring 82 (FIGS. 7 and 8) that cooperates with the main valve seat portion 72 of the frame 50 during a flushing operation of the flush valve 28 as described below.

The restricted passage 42 is defined within an orifice member 84 captured within an opening in the diaphragm plate 62 by a retainer 86 (FIG. 7). An orifice pin 88 extends through the orifice member 84 with clearance establishing the cross sectional area of the flow restriction. Pin movement is limited by contact with the frame 50 and the inner cover 56, and movement of the main valve assembly relative to the pin cleans the restricted passage 42.

The pilot valve assembly 44 includes a head portion 90 in the control chamber 40 and a stem portion 92 extending downward within the guide tube 78 of the main valve assembly 38. The head portion is normally held by pressure in the control chamber 40 in sealing relation against a valve seat surface 94 (FIG. 7) on the diaphragm plate 62. The valve seat surface 94 surrounds a vent opening 96 (FIG. 7) extending through the diaphragm plate 62 from the control chamber 40 to the interior of the guide tube 78.

The head portion 90 of the pilot valve assembly 44 includes a head flange 98 of a pilot valve base 100. A generally cup shaped pilot valve seal 102 (FIGS. 6 and 12) made of elastomeric material such as rubber is mounted upon the head flange 98. A reentrant rim portion 104 of the seal 102 (FIG. 12) extends under the head flange 98 and engages the valve seat surface 94. A central upper portion 106 covers the top of the head flange 98. A hub portion 108 is received in a central opening of the pilot valve base 100. When the main valve assembly 38 is fully open (FIG. 5) the central upper portion 106 engages a central abutment 110 on the inner cover 56.

Figure 11:
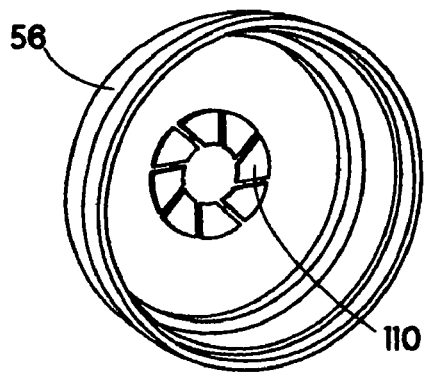
FIG. 11 is an enlarged isometric view of the inner cover.
Figure 12:
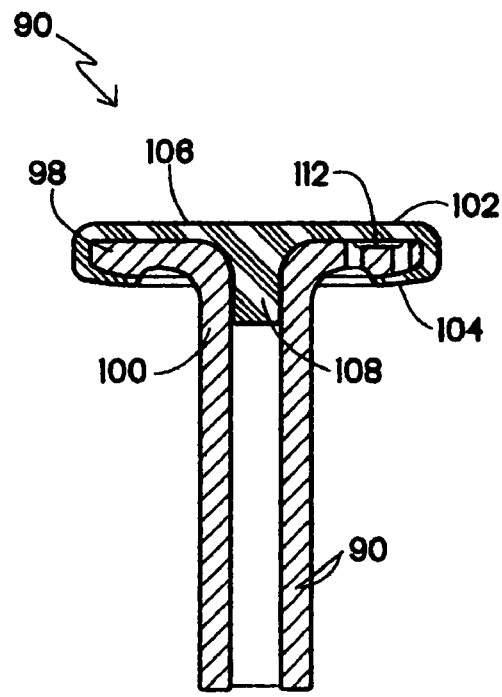
FIG. 12 is an enlarged cross sectional view of the head assembly of the pilot valve assembly.

The abutment 110 is configured with a valve rotator configuration best seen in FIG. 11. Service life of the seal 102 is extended because with each movement of the main valve assembly 38 to the full open position of FIG. 5, the elastomeric central portion 106 of the pilot valve seal 102 engages the rotator abutment 110 and the pilot valve assembly is incrementally rotated, spreading valve contact wear evenly over the circumference of the reentrant rim portion 104 of the pilot valve seal 102. In addition, if the pilot valve seal becomes worn, it is easily replaced because it can be removed by stretching the material of the seal 102 to remove it from the head flange 98. A new, replacement seal is then mounted on the head flange in the same way. Vent paths 112 in the head flange 98 prevent liquid from being trapped within the pilot valve seal 102.

The stem portion 92 of the pilot valve assembly 44 is seen in FIG. 7 and includes a stem shaft 114 secured in a stem socket portion 116 of the pilot valve base 100. A stem sleeve 118 is slideably received on the shaft 114 where it is retained by a head portion 120.

Figure 3:
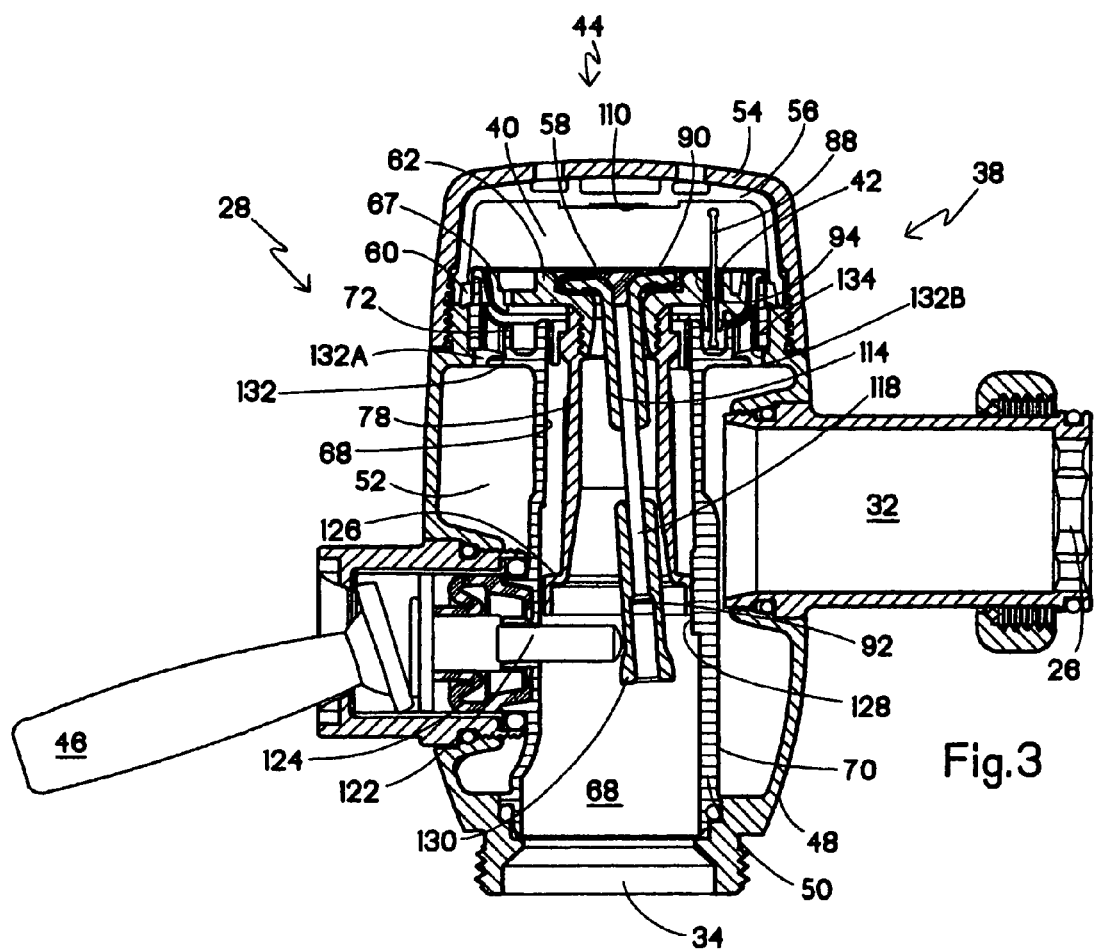
FIG. 3 is a view like FIG. 2 showing the pilot valve being opened by the handle and push rod at the beginning of a flush cycle.
Figure 4:
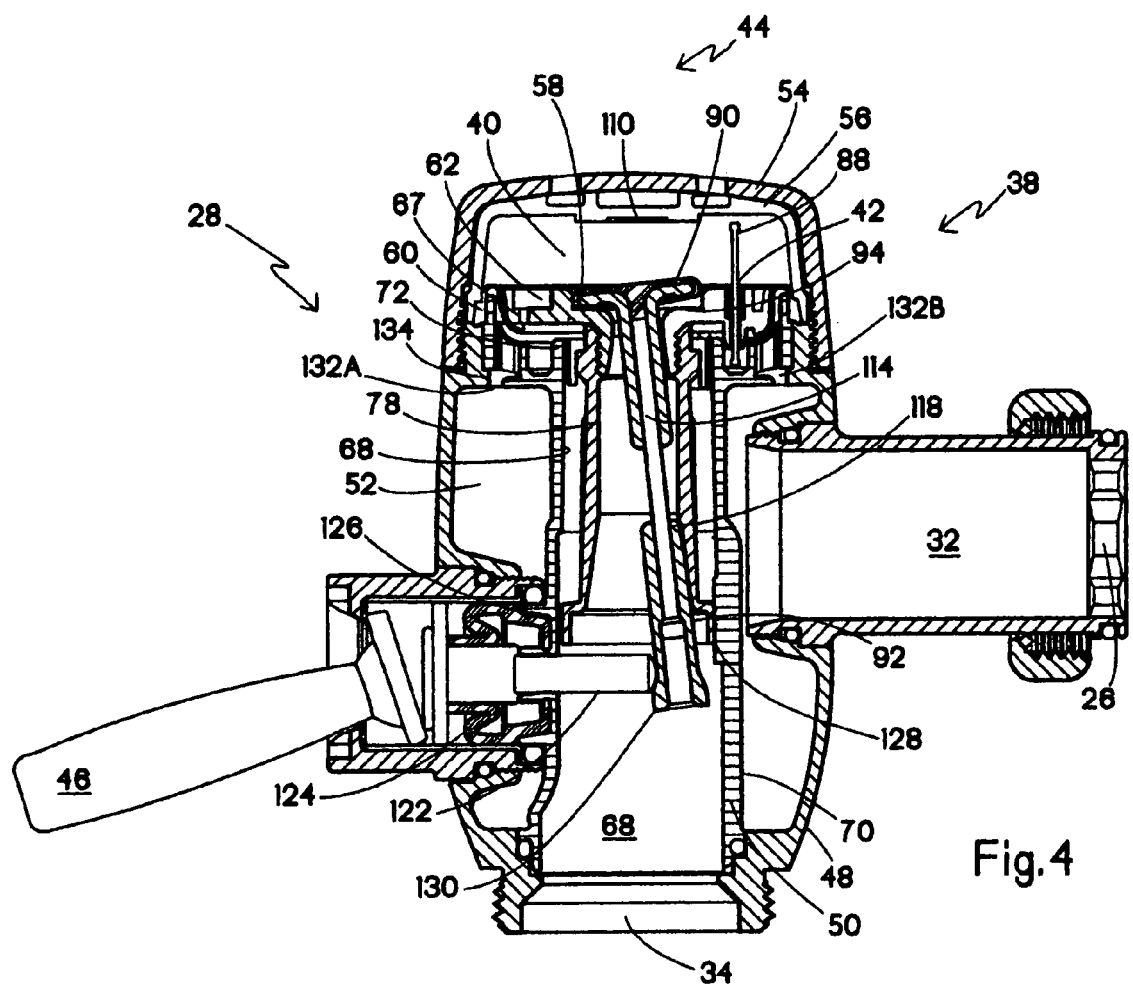
FIG. 4 is a view like FIG. 3 showing the pilot valve moved further open as the main valve opens.

A flush cycle of the illustrated flush valve 28 is initiated by actuation of the handle 46 from the standby position of FIG. 2 to the actuated position seen in FIG. 3. A push rod member 122 partly contained in a bladder 124 is displaced radially inward toward the axis of the flush valve 28 and contacts the stem portion 92 of the pilot valve assembly 44. As a result, the head portion 90 of the pilot valve assembly 44 is tilted or pivoted away from the pilot valve seat surface 94 as seen in FIG. 2. The control chamber 40 is rapidly vented to the outlet 34 as water flows from the chamber 40, through the vent opening 96 and downward through the guide tube 78. Release of pressure in the control chamber 40 permits inlet pressure to rapidly move the main and pilot valve assemblies 38 and 44 to the full open position seen in FIG. 5.

In the normal, standby, closed position of FIG. 2, the head portion 90 of the pilot valve assembly 44 is clamped shut against by the main valve assembly 38 by the differential in pressure between the relatively high inlet pressure in the control chamber 40 and the relatively low outlet pressure downstream of the main valve seat 72. When inlet pressure is high, this clamping force can be large.

A problem with known flush valves is that the force clamping the pilot valve closed can be large enough to prevent reliable valve actuation for initiation of a flush cycle. A large side load force is needed to unseat the pilot valve. However, instead of tilting the pilot valve to an open or vent position, the radial, off center thrust of the push rod against the pilot valve stem, and the resulting tilting movement of the pilot valve stem, can cause the main valve assembly and the clamped pilot valve assembly to tilt in unison. Instead of a rapid venting of the control chamber, an uncontrolled and inconsistent leakage flow across the main valve seat can occur.

In order to overcome this problem, in the flush valve 28 of the present invention, the main valve assembly is firmly supported so that it cannot pivot when an off center, radial actuating force is applied to the pilot valve assembly 44. The guide tube 78 includes an enlarged diameter skirt portion 126 at its lower end. The frame 44 of the housing assembly 30 includes a sturdy, massive support rib 128 located diametrically opposite to the push rod 122. The rib 128 engages the skirt 126 (FIG. 9) and positively prevents tilting of the main valve assembly 38 when a radial actuating force is applied by the push rod 122. As a result, even at elevated inlet pressures, actuation of the handle 46 and radial inward movement of the push rod 122 consistently results in pivoting of the pilot valve assembly 44 relative to the main valve assembly 38 to a vent or open position.

In accordance with the present invention, the lower end of the pilot valve stem portion 92 is enlarged in order to provide a toggling open effect upon actuation of the pilot valve assembly 44. In the illustrated arrangement, the pilot valve stem sleeve 118 includes a bell shaped enlargement 130 at its lower end. In the closed position (FIG. 2) and upon initial actuation (FIG. 3) the enlargement 130 is below the contact end of the push rod 122. Immediately following the initial tilting contact of the push rod 122 against the stem portion 92, as the control chamber 40 is rapidly exhausted, the pilot valve assembly 44 moves upward. The enlargement 130 engages the end of the push rod 122 (FIG. 4), and the pilot valve stem portion is tilted further off center without further movement of the handle 46 or push rod 122. This provides a toggle-like, snap opening effect, assuring consistent actuation even if the manipulation of the handle 46 is limited and rapid or tentative.

Figure 5:
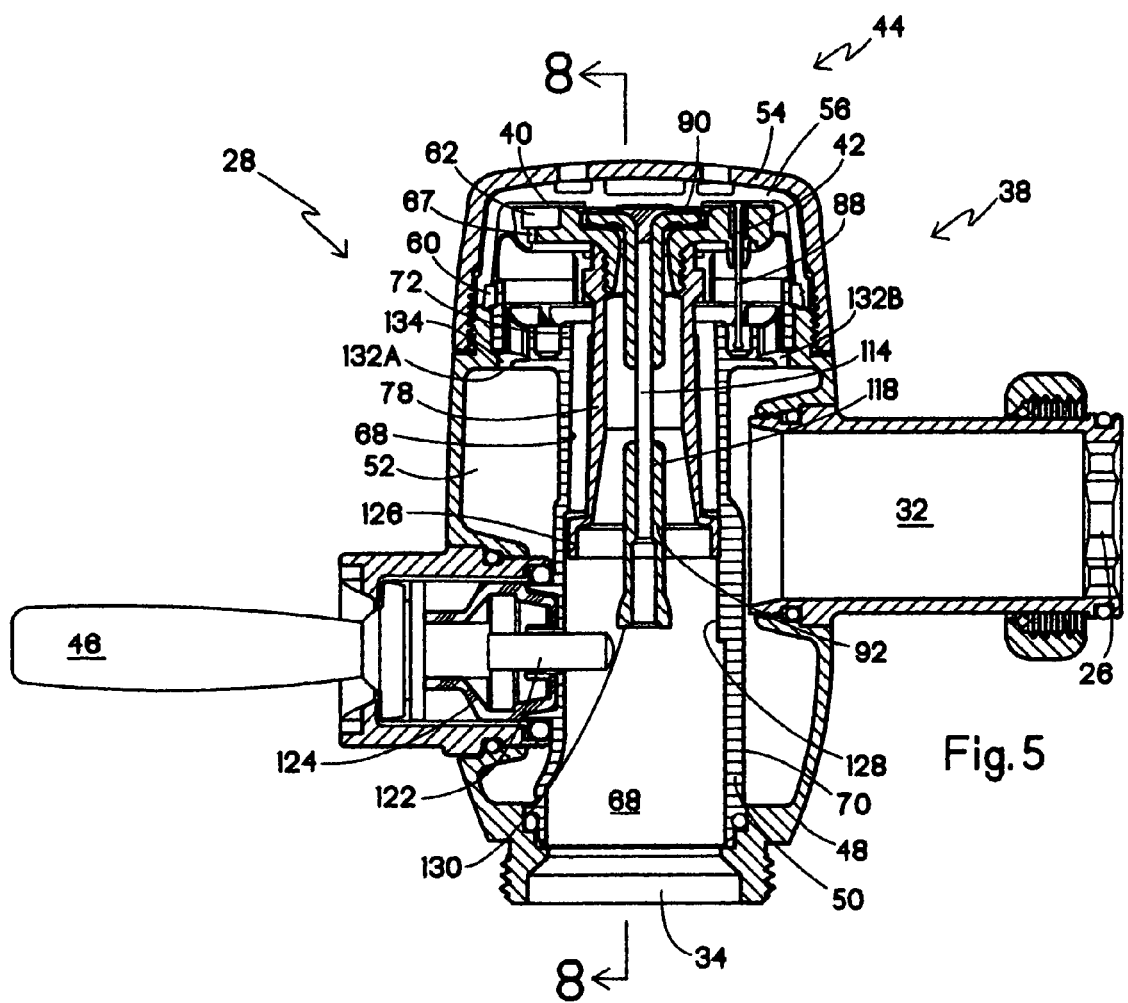
FIG. 5 is a view like FIGS. 2-4 showing the flush valve in the fully open position.

When the main and pilot valve assemblies 38 and 44 reach the full open position seen in FIG. 5, the rotator structure of the abutment 110 imparts a slight, wear distributing angular offset to the pilot valve seal 102 and the pilot valve assembly 44. The main valve assembly 38 including the valve member seal portion 64 moves away from the main valve seat surface 94 of the frame 50, and water flows from the inlet 32, under the main valve assembly 38 and through the main valve seat 72 and the outlet passage 68 in the frame 50 to the outlet 34.

Flow and pressure conditions through the flush valve 28 are not uniform about the central longitudinal axis. The primary reason for this is the radially oriented inlet 32 that introduces the flow of water into the inlet pressure region 52 from the side. The side entry flow causes a ram effect with increased pressure in the portion of the region 52 opposite to the inlet 32 and decreased pressure in the portion of the region 52 adjacent to the inlet 32. This non uniform pressure field can cause difficulties such as side loading of the main valve assembly 38 and increased operating friction. In addition, non uniform pressure in the control chamber 40 can render the flush valve operation undesirably sensitive to the location of the diaphragm 58 and the restricted flow passage 42.

Figure 10:
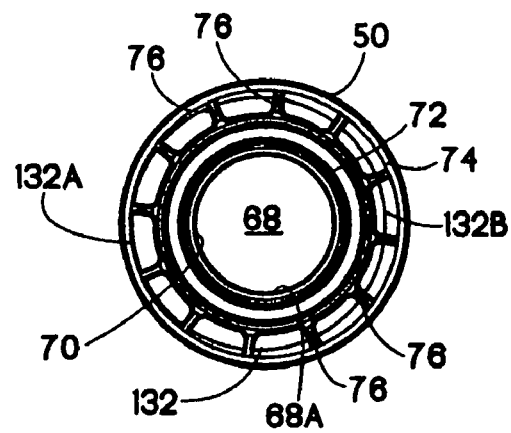
FIG. 10 is an enlarged top plan view of the frame.

In order to avoid the difficulties of non uniform pressure in the region of the main valve assembly 38 and in the control chamber 40, the frame 50 includes a flow equalizing baffle 132 located upstream from the main valve assembly 38. In the illustrated embodiment of the invention, the baffle 132 is circular and lies in a radial plane within a circular inlet flow aperture 134 formed in the body 48 beneath the main valve seat 72. The circular flow aperture 134 is symmetrical with the vertical longitudinal axis of the flush valve 28, whereas the baffle 132 is offset and is asymmetrical as can be seen in FIG. 10. In order to compensate for flow pattern differences in the inlet pressure region 52, the baffle 132 is offset in a radial direction away from the inlet port 32. One side 132A of the baffle opposite to the inlet port 32 is relatively close to the circular aperture 134, while the opposite side 132B, nearest the inlet port 32, is spaced further from the edge of the circular aperture 134.

The baffle 132 partially restricts inlet flow, but creates only a small pressure loss at maximum flow. The distribution of the baffle flow restriction relative to the side entry inlet port 32 compensates for the flow velocity effect of the port 32, providing a uniform pressure field at the main valve assembly 38 and in the control chamber 40. Side loading and resulting valve operating friction are reduced or eliminated, and the diaphragm 58 and restricted low passage 42 can be randomly placed with minimal effect on valve operation and flow volume delivery.

When the main and pilot valve assemblies 38 and 44 reach their uppermost, full open position, the delivery of a metered and regulated flow of water for a flush cycle begins. In the full open position (FIG. 5), the control chamber 40 is at a minimum volume and is sealed as the pilot valve head portion 90 is forced by contact with the central abutment 110 tightly against the pilot valve sealing surface 94 on the diaphragm plate 62.

The main valve assembly 38 then gradually recloses with a dash pot like operation as the control chamber 40 is refilled from the inlet pressure region chamber 52 by flow through the restricted flow passage 42. The flow rate is determined by the clearance between the orifice member 84 and the self cleaning orifice pin 88. A proportional relationship exists between the main valve flow area and the area of the restricted flow passage 42. The same inlet pressure region 52 acts on both the main valve and on the restricted passage 42, and the water flow through the main valve from the inlet 32 to the outlet 34 is in a fixed ratio to the flow through the restricted passage 42 into the control chamber 40. The proportional relationships insure that a constant water flush volume is maintained despite variations in supply pressure or differential pressure variations across the flush valve 28.

The illustrated flush valve 28 is designed to provide a flow of water configured for siphon type toilet fixtures that use a two stage flow delivery. For this type of plumbing fixture, the initial part of the flush cycle is a relatively high volume flush flow for evacuating the fixture with a siphon action. The flush flow is followed by a relatively low volume flow for resealing the trap of the fixture. Flushing performance of a siphon type fixture is improved if the initial high flow is maintained at a sustained flow rate even if the flow rate is less than the possible maximum, and also if the transition from the high flush flow to the low reseal flow is abrupt.

In order to optimize the flow characteristics during a siphon fixture flush cycle, the flush valve 28 of the present invention uses two different flow throttling assemblies that are sequentially active during the high flow flush portion of the cycle. A secondary flow throttling assembly 136 attenuates flow at the beginning of the high flow portion, and a primary flow throttling assembly attenuates flow at the end of the high flow portion.

Figure 9:
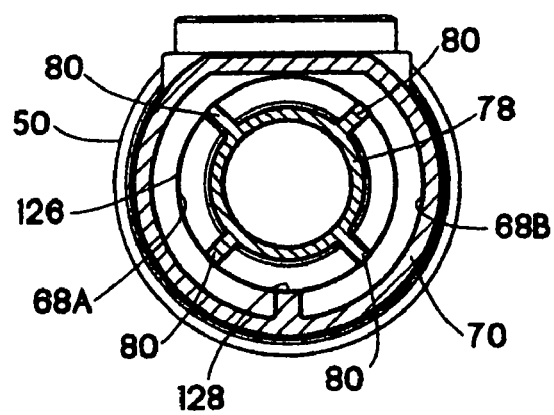
FIG. 9 is a cross sectional view of the frame and guide tube taken along the line 9-9 of FIG. 8.

The outlet flow passage 68 in the frame 50 (FIG. 8) extends from the main valve seat 72 to the outlet 34. The passage 68 has an upstream segment 68A having a diameter generally equal to the diameter of the enlarged diameter skirt portion 126 of the guide tube 78. A shoulder 142 separates the segment 68A from a downstream segment 68B having a larger diameter and providing substantial clearance for unimpeded flow around the skirt portion 126 (FIG. 9). The skirt 126 and the shoulder 142 provide the secondary flow throttling assembly 136.

The use of the rolling diaphragm 58 provides an extended stroke for the main valve assembly 38, and the main valve assembly moves a substantial distance between the full open and the closed positions of FIGS. 5 and 2. As seen in FIGS. 5 and 8, in the full open position at the start of a flush cycle, the skirt portion 126 approaches the shoulder 142 to throttle flow through the outlet flow passage 68. This reduces the flow below the flow rate that could be achieved without the secondary throttling assembly 136, but contributes to achieving improved flushing performance by cooperating with the primary flow throttling assembly 138 to maintain a relatively uniform high volume flush flow.

The refill flow control ring 82 cooperates with the main valve seat 72 to provide the primary flow throttling assembly 138. As the main valve assembly moves downward from the full open position, the skirt portion 126 moves away from the shoulder 142, decreasing the flow throttling effect of the secondary flow throttling assembly 136. Simultaneously, as the lower edge of the ring 82 approaches the valve seat 72, the primary throttling assembly 138 begins to throttle flow. As the main valve assembly 38 descends, the throttling effect transitions from the secondary throttling assembly 136 to the primary throttling assembly 138 to maintain a high flush flow that is more uniform than would be obtained without the secondary assembly 136.

The refill flow control ring 82 is provided with flow regulating grooves 144 extending upwardly from its lower edge. As the lower edge of the ring 82 reaches the main valve seat 72, the flow decreases from the high flow flush segment to the lower trap reseal flow that is supplied through the grooves 144. Because of the extended main valve stroke achieved with the rolling diaphragm 58, there is a sharp and well defined transition from the high flush flow to the lower trap reseal flow.

Alternatively the flush valve 28 can be configured for urinal applications where the fixture is provided with a relatively constant, low volume flow for wash down of the fixture. For example, the flow control ring 82 can be modified to provide only a relatively constant fixture wash down flow. Many of the principles of the present invention are applicable to flush valves configured for either siphon flush or urinal fixtures.

The skirt 126 has the additional function of guiding flow outward in the downstream passage segment 68B and away from the stem sleeve 118 and from the bell shaped enlargement 130.

As the main valve assembly 38 descends toward the closed position of FIG. 2, the enlarged bell portion 130 of the sleeve 118 approaches the end of the push rod member 122. If the handle is held in the actuated position, the enlargement 130 can be in the path of the descending sleeve 118. In this event, the sleeve 118 slides up on the stem shaft 114, permitting the main valve assembly 138 to close regardless of the position of the handle 46.

In one exemplary embodiment, the flush valve housing 30 discussed above provides additional benefits over the prior art. Any connection of flush valves requires penetration into the pressure cavity by various protrusions for kit insertion/maintenance, water outlet, water inlet, and some initiating mechanism (such as a manual handle or an automated actuator). In the prior art these openings in the valve body typically have utilized exterior bosses to connect the protrusions to the valve body. For example, exterior threaded bosses in combination with a seal and nut have been used previously. In order to withstand the pressure from the water in the valve body on the exterior bosses and protrusions, the prior art has relied upon high strength materials such as metals and larger amounts of such materials to create a mechanical attachment and sealing means between the valve body and the protrusions.

The use of an exterior boss restricts the materials that can be used as discussed above. This in turn restricts the visual presentation that can be made by the flush valve. However, the use of an interior boss in accordance with the present invention allows for a wider choice in design materials as well as the use of a wider range of design shapes for the flush valve due to the absence of bulky exterior bosses. The flexibility in material choices allowed by the present invention's interior bosses is of importance for manufacturers as it allows them to reduce material and offer alternative material selections depending upon the specific application. In addition, the use of interior bosses provides a valve body with a simpler profile which is both easier to clean and easier to fabricate. In addition, the interior bosses each have a common axis of entire geometry.

In accordance with one embodiment of the present invention shown in FIG. 2, internal bosses 150, 148, particularly in the areas of water inlet 32 and handle 46, afford several advantages. First, hydraulic pressure between the water inlet 32 and the outer diameter of the internal boss 148 cancel each other out, resulting in no mechanical load transfer to the mechanical joint from hydraulic pressure. In contrast, the external bosses of the prior art would have to support the internal pressure which would generate hoop stress in tension, requiring a stronger material or more material be used to support the hydraulic load.

In regard to the handle 46 and joint internal boss 150, it is exposed to hydraulic pressure on the outer diameter only, resulting in this boss 150 being under compressive hoop stresses. This provides an advantage over prior art external bosses, which are under tension-type loads, because most materials are stronger under compressive type loads than under tension-type loads. This allows this internal bosses 148, 150 of the present invention to be made with less material or an alternate weaker material (plastics) than a comparable external boss. The use of the internal boss 150 for the handle results in a transfer of exterior loads onto the housing 30. As shown in FIG. 2, pushing forces 156 are transferred to a portion 152 of the housing 30 in a direction that the housing 30 is inherently strong, i.e. parallel to housing vertical axis 154. An exterior boss would tend to twist when experiencing the same force 156 and this mechanical load would tend to collapse the valve body.

While the present invention has been described with reference to the details of the embodiments of the invention shown in the drawing, these details are not intended to limit the scope of the invention as claimed in the appended claims.

What is claimed is:

1. A flush valve for a plumbing fixture, said flush valve comprising;
- a housing having a longitudinal axis, an inlet, an outlet, an actuator opening, and a main valve seat between said inlet and said outlet, said main valve seat being oriented transverse to said axis;
- the actuator opening having an actuator boss positioned adjacent thereto and internal to the housing;
- the inlet having an actuator boss positioned adjacent thereto and internal to the housing;
- a main valve assembly including a main valve member movable in the axial direction relative to said main valve seat;
- a control chamber at a first side of said main valve member and communicating with said inlet for normally holding said main valve member against said main valve seat;
- said main valve assembly including a guide tube extending axially from a second side of said main valve member;
- said main valve assembly including a pilot valve seat;
- a pilot valve member movable relative to said pilot valve seat;
- a stem extending axially from said pilot valve member;
- an actuator at a first side of said axis engageable with said stem for tilting said pilot valve by laterally moving said stem.

2. The flush valve of claim 1, wherein said housing includes a support abutment engaging said guide tube at a second side of said axis opposite to said first side of said axis for opposing the tilting force applied by said pilot valve to said main valve assembly during said lateral movement of said stem.

3. A flush valve as claimed in claim 2, said housing including a tubular wall defining an outlet passage extending between said main valve member and said outlet, said guide tube extending within said tubular wall, and said support abutment comprising an axially extending support rib on said tubular wall.

4. A flush valve as claimed in claim 3 further comprising a plurality of guide ribs in sliding contact between said tubular wall and said guide tube.

5. A flush valve as claimed in claim 3, said housing including an outer body and an inner frame, said inner frame including said tubular wall and said support rib.

6. A flush valve as claimed in claim 3, said guide tube having an enlarged skirt portion at its lower end, said support rib being in sliding engagement with said skirt portion.

7. The flush valve of claim 1, wherein said main valve assembly includes a diaphragm connected in sealing relation to said housing, said control chamber being defined in part by said diaphragm.

8. A flush valve as claimed in claim 7, further comprising a restricted passage in said diaphragm connecting said control chamber to said inlet.

9. A flush valve for a plumbing fixture, said flush valve comprising;
- a housing having a longitudinal axis, an inlet, an outlet, an actuator opening, and a main valve seat between said inlet and said outlet, said main valve seat being oriented transverse to said axis;
- the actuator opening having an actuator boss positioned adjacent thereto and internal to the housing;
- the inlet having an inlet boss positioned adjacent thereto and internal to the housing;
- a main valve assembly including a main valve member movable in the axial direction relative to said main valve seat;
- a control chamber at a first side of said main valve member and communicating with said inlet for normally holding said main valve member against said main valve seat;
- said main valve assembly including a guide tube extending axially from a second side of said main valve member;
- said main valve assembly including a pilot valve seat;
- a pilot valve member movable relative to said pilot valve seat;
- a stem extending axially from said pilot valve member;
- an actuator at a first side of said axis engageable with said stem for tilting said pilot valve by laterally moving said stem;
- said housing including a support abutment engaging said guide tube at a second side of said axis opposite to said first side of said axis for opposing the tilting force applied by said pilot valve to said main valve assembly during said lateral movement of said stem;
- wherein the internal actuator boss is adapted to be exposed to hydraulic pressure on an outer diameter only.

* * * * *